Nov. 18, 1969  E. C. MATHEWS  3,479,591
INDICATOR HOUSING WITH A POINTER DRIVING MEANS HAVING
A FRONT FACE CONCAVE SCALE MEMBER
Filed Sept. 29, 1965
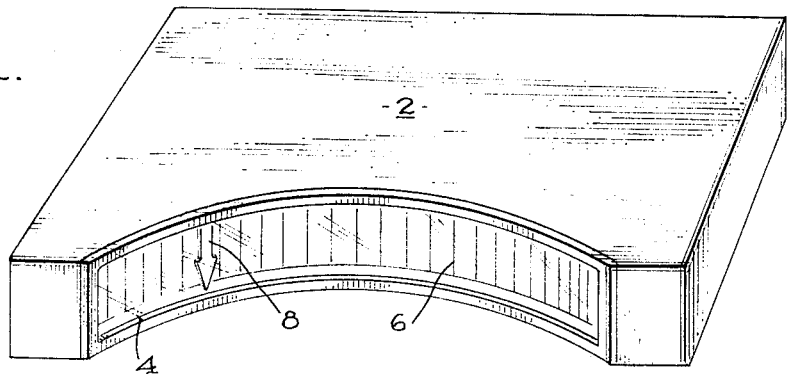
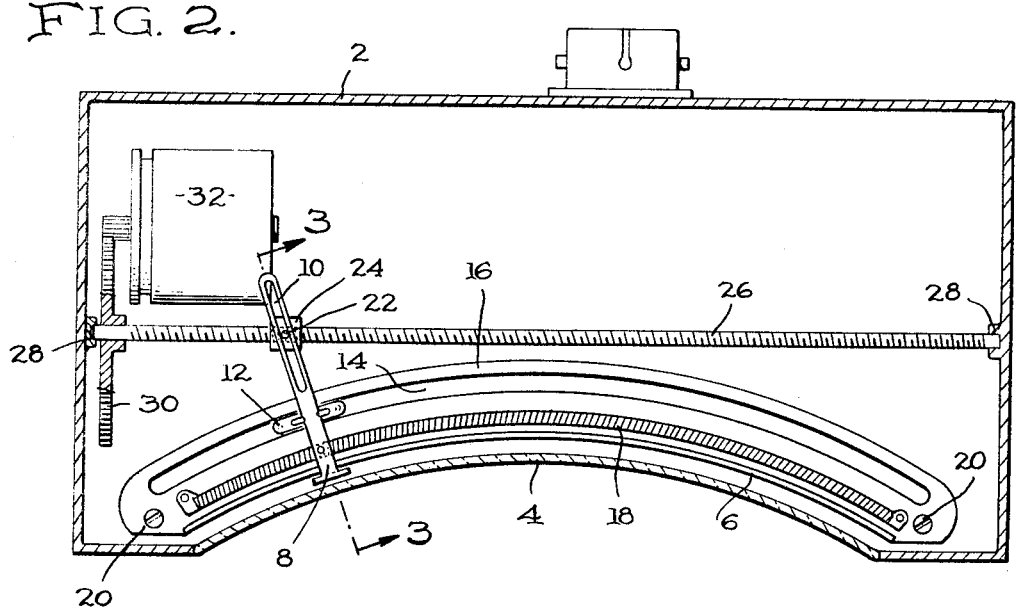
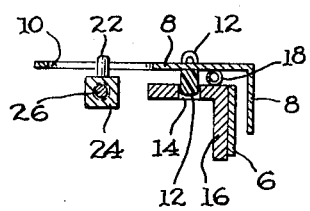
INVENTOR
EDWARD C. MATHEWS
BY *Edwin E. Greigg*
ATTORNEY United States Patent Office 3,479,591
Patented Nov. 18, 1969

3,479,591
INDICATOR HOUSING WITH A POINTER DRIVING MEANS HAVING A FRONT FACE CONCAVE SCALE MEMBER
Edward C. Mathews, Yorktown Heights, N.Y., assignor to Simmonds Precision Products, Inc., Tarrytown, N.Y., a corporation of New York
Filed Sept. 29, 1965, Ser. No. 491,168
Int. Cl. G01r 17/06
U.S. Cl. 324—99    4 Claims

ABSTRACT OF THE DISCLOSURE

An indicating device utilizing a curved scale, the convex surface of which faces the interior of a housing. A pointer rides along the scale and is driven by a lead screw mechanism located within the interior of the housing, the latter being equipped with a lost motion connection for translating straight line motion to curved line motion.

---

This invention relates to dial scale indicators and, more particularly, to a curved dial face arrangement which allows for distortion-free vision.

Ordinarily, the conventional scale mounted on the front face of a servo unit or the like is flat or convex, the latter design accommodating arcuate movement of the pointer pivoted within the housing behind the scale. When viewing the ends of the scale from a central position, the spaces between the indicia become distorted to the observer because the plane of the scale at its ends is not substantially normal to the line of sight of the observer. Where the observer position is stationary, as for example in a spacecraft, this distortion cannot be corrected without altering the shape of the scale. If the scale is shaped so as to be convex with respect to the observer, then the above-mentioned difficulties are avoided, since the end portions of the scale become substantially normal to the observer's line of sight. This scale arrangement has been achieved at the expense of placing the scale to the rear of the pointer moving mechanism as, for example, in the case of a pivotal pointer whose radius defines the curvature of the scale. One significant defect for this arrangement is that a full view of the scale can never be realized because of the partial obstruction of the pointer mechanism positioned in an area in front of the scale.

Accordingly, it is the object of this invention to provide an indicator apparatus having a convex-shaped scale with respect to the observer.

It is a further object to provide an indicator apparatus having a convex scale on the front face of the apparatus to provide an unobstructed full view of the scale.

In accordance with one aspect of the device embodying the principles of this invention there is provided a hollow housing having an open front face in which there is positioned a curved scale having its convex surface facing the interior of the housing. Within the interior of the housing there is provided a lead screw which is rotatable in response to a suitable servo unit. Cooperating with the lead screw is a threaded follow-up means having a pin for receiving a slotted pointer. The front end of the pointer rests on an elongated cam structure having the same curvature as the scale and upon which the front portion of the pointer is supported for guided movement therealong.

A better understanding of the invention will be had after reading the following detailed description with reference to the attendant drawings in which:

FIG. 1 is a perspective view of the indicator apparatus according to the principles of this invention;

FIG. 2 is a plan view of the indicator apparatus shown in FIG. 1; and

FIG. 3 is a cross-sectional view of the pointer mechanism taken along the line 3—3 of FIG. 2.

Referring now to FIG. 1, there is shown a rectangular shaped housing 2 having an open front face. A suitable glass window 4 is provided on the front face of the housing 2 for protecting the scale 6 and pointer 8. The housing 2 may be inserted into any suitable instrument panel thus leaving only its front face exposed to view. An observer then centrally positioned with respect to the scale 6 will experience distortion-free vision throughout the entire length of the scale due to its concave shape. With this arrangement the observer need not shift his position in order to accurately read the scale.

In FIGS. 2 and 3, the pointer 8 is seen to extend rearwardly of the scale 6 to a position overlying a lead screw 26. The pointer is equipped with a guide member 12 suspended therefrom and composed of a suitable material such as Teflon. The guide member 12 is adapted to ride in an elongated recess 14 in a support member 16 of generally L-shaped configuration and secured at its respective ends by suitable screw means 20 to the housing 2. The support member 16 is curved to accommodate the scale 6 which is attached thereto. Positioned along the path of the support member 16 is a tubular metal runner 18 which can also function as a rebalancing potentiometer and upon which rests the front portion of the pointer 8 which may also take the form of a wiper contact arm in the case where the runner 18 is a potentiometer. The rear portion of the pointer 8 is provided with an elongated slot 10 which is received by a pin 22 vertically extending from a traveler nut 24 supported on the lead screw 26. The lead screw is positioned behind the support member 16 as shown in suitable bushings 28 on the side walls of the housing 2. At one end of the lead screw 26 there is fixedly secured a gear wheel 30 adapted to be driven by a suitable servo mechanism 32.

In operation the servo mechanism 32, upon being energized from an appropriate source, turns the lead screw 26 through the gear means 30. To register this movement of the servo along the scale 6, the pointer 8 follows the traveler nut 24 by means of the pin and slot connection 22 and 10, respectively. The guide member 12 attached to the pointer 8 is caused to follow the elongated groove or recess 14 as the traveler nut imparts motion to the pointer. Because the guide member 12 is elongated, it prevents the pointer from twisting or rotating about the longitudinal axis of the support member 16.

As previously mentioned, the metal runner may function as part of the servo mechanism by operating as a rebalancing potentiometer. In this case the pointer 8 would operate as a wiping contact in the conventional manner known to those skilled in the art. Suitable wiring would connect the metal runner 18 and pointer 8 with the servo mechanism housing 32.

Although only one embodiment of the invention has been depicted and described, it will be apparent that this embodiment is illustrative in nature and that a member of modifications in the apparatus and variations in its end use may be effected without departing from the spirit or scope of the invention as defined in the appended claims.

That which is claimed is:
1. In an indicating device, a hollow housing, means defining an opening on the exterior of said housing, a curved indicia bearing strip member positioned in said opening and having its convex surface facing the interior of said housing, a pointer mounted for sliding engagement with said strip member and means located within the interior of said housing for moving said pointer along the curve defined by said strip member, said last named means including a lead screw having lost motion means for driving said pointer.

2. An indicating device comprising a hollow housing, means defining an opening on the exterior of said housing, a curved scale member positioned in said opening and having its convex surface facing the interior of said housing, a pointer mounted for sliding engagement with said scale member and means located within the interior of said housing facing the convex surface of said scale member for moving said pointer along the curve defined by said scale member.

3. In a device according to claim 1 wherein said lost motion means comprises a pin and slot connection between said pointer and said lead screw.

4. In a device according to claim 2 further comprising a rebalancing servo mechanism wherein said curved scale member is provided with a metal coil element for operating as a potentiometer and said pointer is connected in a circuit connecting said potentiometer and said servo mechanism for operating as a contact wiper.

References Cited

UNITED STATES PATENTS

| | | | |
|---|---|---|---|
| 1,555,908 | 10/1925 | Burkhart | 324—99 |
| 1,630,989 | 5/1927 | Usigli | 324—99 |
| 2,836,793 | 5/1958 | Kelley | 324—156 XR |

FOREIGN PATENTS 629,930  4/1935  Germany.

RUDOLPH V. ROLINEC, Primary Examiner

ERNEST F. KARLSEN, Assistant Examiner

U.S. Cl. X.R.

116—129; 324—156